Dec. 17, 1957  C. R. HUTCHCROFT ET AL  2,816,321
EQUIPMENT FOR CHARGING FIBRE-CONTAINING SLURRY INTO MOLDS
Filed June 18, 1953  3 Sheets-Sheet 1
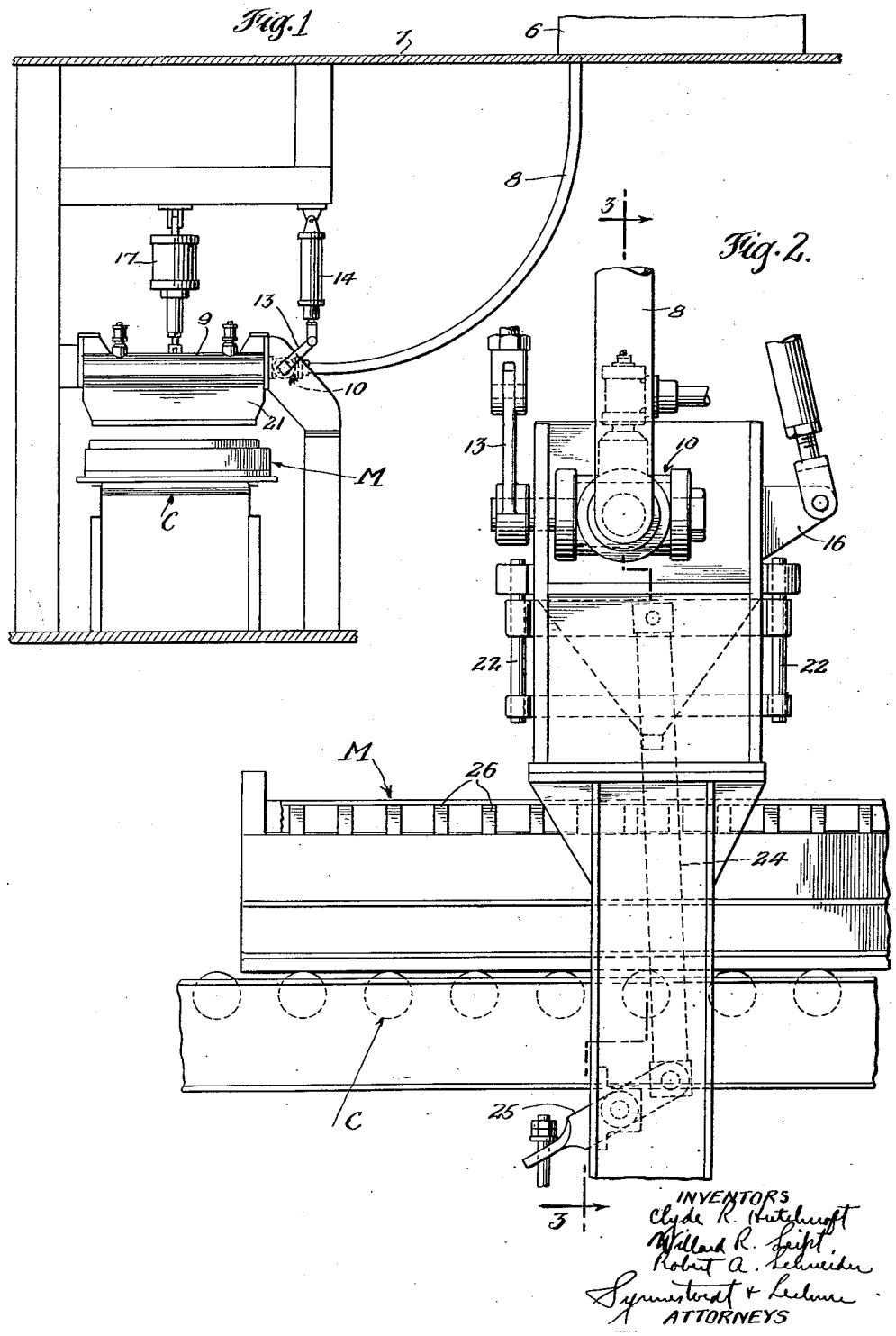
INVENTORS
Clyde R. Hutchcroft
Willard R. Seipt
Robert A. Schneider
Synnestvedt & Lechner
ATTORNEYS Dec. 17, 1957 C. R. HUTCHCROFT ET AL 2,816,321
EQUIPMENT FOR CHARGING FIBRE-CONTAINING SLURRY INTO MOLDS
Filed June 18, 1953 3 Sheets-Sheet 2

INVENTORS
Clyde R. Hutchcroft
Willard R. ...
Robert A. Schneider
ATTORNEYS

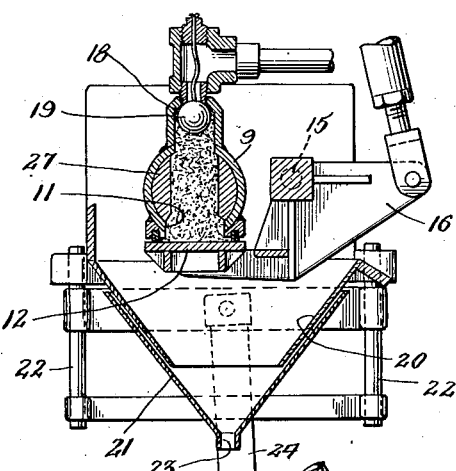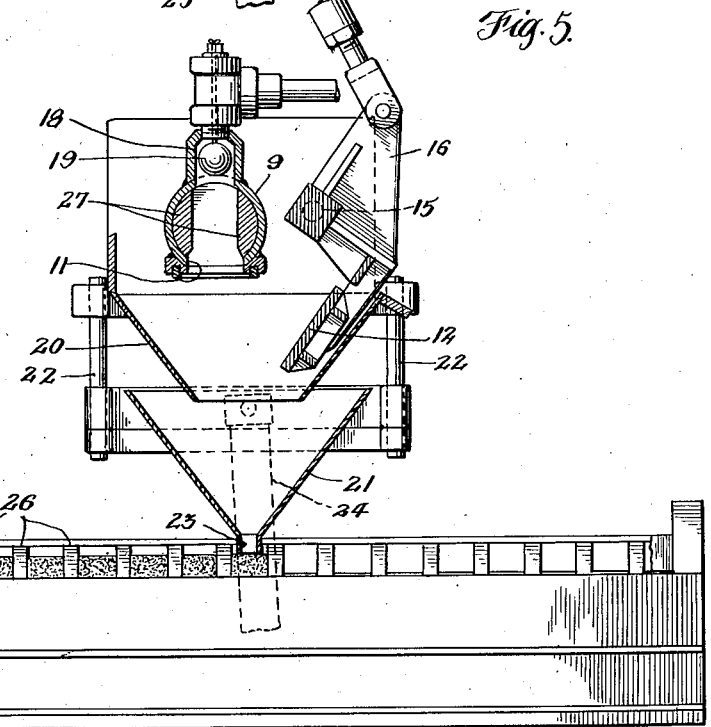

United States Patent Office 2,816,321
Patented Dec. 17, 1957

2,816,321

EQUIPMENT FOR CHARGING FIBRE-CONTAINING SLURRY INTO MOLDS

Clyde R. Hutchcroft, Eureka, Willard R. Seipt, North Wales, and Robert A. Schneider, Fort Washington, Pa., assignors to Keasbey & Mattison Company, Ambler, Pa., a corporation of Pennsylvania Application June 18, 1953, Serial No. 362,454

7 Claims. (Cl. 18—30)

This invention relates to the charging of material in slurry form into molds for the molding of articles from such slurry. The invention is especially concerned with the charging of a fibre-containing slurry of the general kind represented by the fibre-containing calcium silicate type of admixtures which are used for the formation of low density heat insulating blocks and other shapes.

Materials of the general kind referred to just above are described in copending application Serial No. 104,128, filed July 11, 1949, issued August 23, 1955, as Patent 2,716,070, and assigned to the assignee of the present application. Briefly, such materials essentially consist of calcium hydroxide, siliceous material, and asbestos fibres, the ingredients being prepared in aqueous slurry form, placed in molds and then cured under high temperature and pressure, to thereby form low density thermal insulation blocks or the like therefrom.

The asbestos fibres incorporated in the slurry to be molded are included for the purpose of providing reinforcement. Most of the articles molded from materials of this kind are of elongated shape, and for maximum effectiveness of the fibre reinforcement it is desirable that the fibres be predominantly oriented lengthwise of the article being molded.

One of the principal objects of the invention is the provision of equipment for charging elongated mold cavities with slurry having fibre orientation lengthwise of the mold cavities.

Other objects and advantages of the invention will appear as this description proceeds.

In the drawings which illustrate the preferred embodiment of the apparatus—

Figure 1 is a side elevational view of mold charging equipment constructed according to the present invention, this view also illustrating in outline a mold structure positioned in charging relationship to the charging equipment;

Figure 2 is an enlarged end view of certain portions of the charging equipment and of a mold structure, the view being taken from the right of the corresponding parts in Figure 1;

Figure 4 is a transverse sectional view taken as indicated by the line 4—4 on Figure 3; and Figure 5 is a view of the mechanism shown in Figure 4 but with certain parts in different operating positions, and further illustrating the association of the mold structure therewith.

Figure 3:
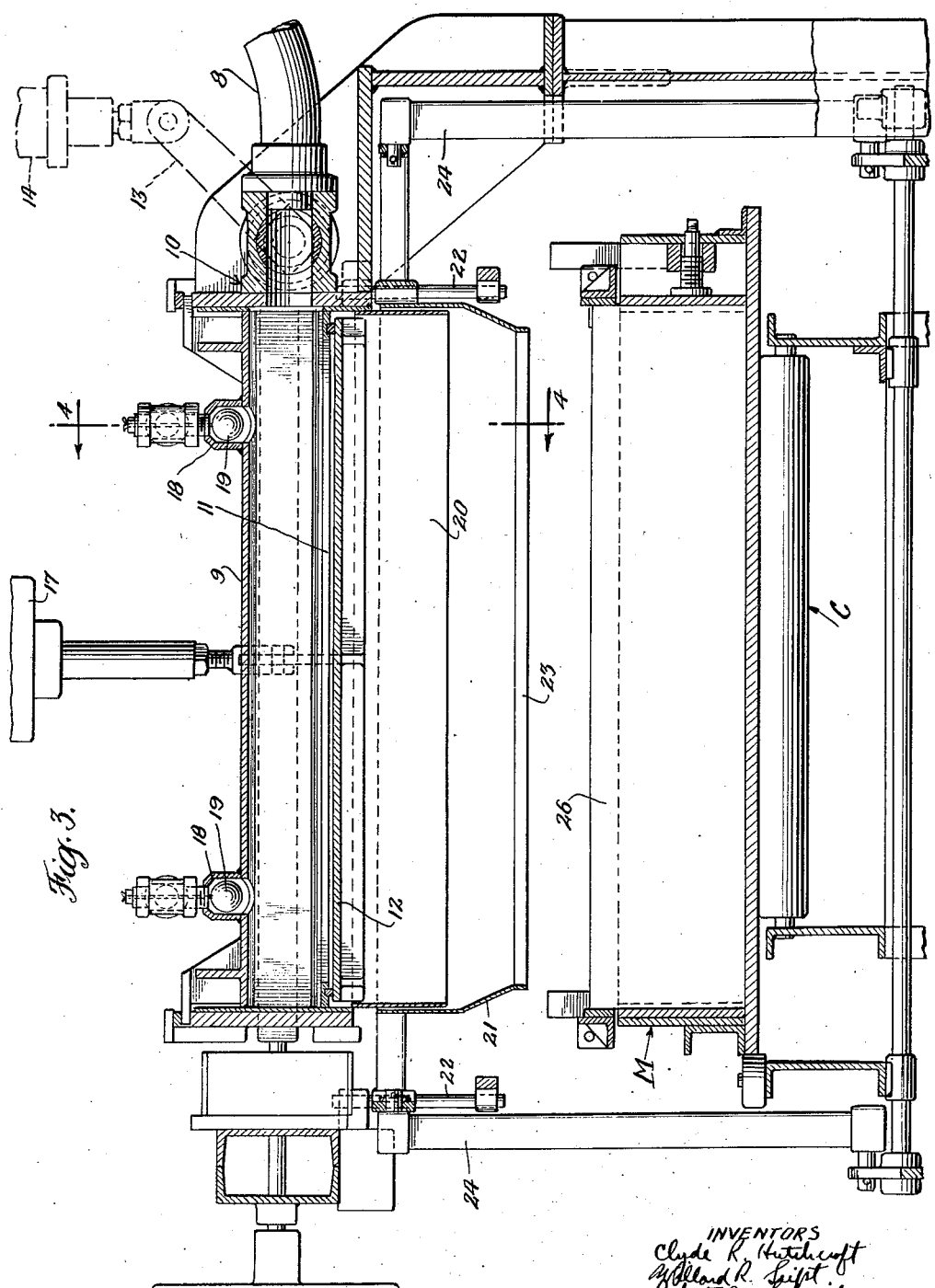
Figure 3 is a sectional view taken substantially as indicated by the line 3—3 on Figure 2.

Referring first to Figure 1, a supply tank for prepared slurry is fragmentarily indicated at 6, this tank being supported on a deck or flooring 7 at an elevation above the charging equipment itself. A supply line 8 extends from the tank 6 to the charging equipment. The supply line 8 is arranged to be substantially free of any sharp angle bends and the flow of the slurry through the supply line is effected by gravity. A flow or supply line arranged in this manner results in fibre orientation lengthwise of the path of flow by virtue of so-called laminar or viscous flow.

According to the invention, the fibre orientation which is initially set up or established by virtue of the viscous flow through the supply line 8 is substantially maintained or preserved throughout the charge measuring and mold filling operations effected by the equipment to be described herebelow.

The equipment includes a charge measuring device 9 comprising a generally cylindrical shell one end of which is in communication with the supply line 8 through a valve 10, and the other end of which is closed. As shown in Figure 3 the valve 10 is of a type providing a smooth surfaced flow passage when the valve is open, so as not to introduce turbulence in the slurry flowing into the device 9.

Along the bottom of the device 9 is an elongated discharge opening 11 adapted to be closed by an elongated displaceable closure member 12.

The inlet valve 10 is adapted to be controlled by the arm 13 which may be operated for example by the fluid pressure piston and cylinder device 14. The closure member 12 for the bottom of the charge measuring device is pivotally mounted at 15 and the pivotal movement is controlled by an arm 16 operated for example by the fluid pressure piston and cylinder device 17.

One or more vents 18 (two being shown in the arrangement illustrated in the drawings) are provided at the top of the charge measuring device 9, and each vent is adapted to be closed by a float valve 19, for example in the form of a wood ball which will rise during the filling operation and finally close off the vent.

Below the charge measuring device 9 is a fixed trough-like funnel 20 into which the measured charge is delivered when the closure member 12 is opened, as in Figure 5. Another trough-like funnel 21 is nested with the funnel 20 and is vertically movable on guide posts 22 between the position indicated in Figure 4 and the position indicated in Figure 5. The funnel 21 has an elongated discharge opening 23 adapted to be brought down into close proximity to a mold cavity to be filled (see Figure 5). Vertical movement of the funnel 21 may be effected by a pair of push rods 24 actuated by an operating lever 25.

A suitable mold structure to be charged is indicated in general by the letter M and is here shown as being mounted beneath the charging equipment as by means of a conveyor C. While the equipment may be employed for charging the cavity or cavities in any type of mold structure, the particular structure here shown in outline is fully illustrated and described in copending application of Ernest A. Muehleck, Harmon C. Kinney, and Ralph L. Lanz, Jr., Serial No. 362,436, filed concurrently herewith, assigned to the assignee of the present application. The details of the mold structure need not be here stated, but it is mentioned that appropriate mold structure includes a plurality of mold cavities, for instance cavities formed to mold elongated blocks. As seen in Figures 2, 3 and 5, the mold structure here shown includes a plurality of partitions or grid elements 26 serving to define a multiplicity of side-by-side elongated block mold cavities.

During the charging of the mold structure of the kind above referred to, the mold is successively advanced in stepwise fashion under the charging equipment, so as to successively fill the several mold cavities.

Filler blocks 27 may be inserted in the charge measuring device 9 in order to determine the volume of the charge. These blocks are replaceable so that charges of varying volume may be measured in the device 9. In this way the equipment may be adjusted to the filling of mold cavities of different volume.

In the operation of the equipment above described, after the positioning of a mold in proper relation to the charging equipment, the lower funnel 21 may be shifted downwardly to register with an individual mold cavity. With the discharge opening of the device 9 closed as in Figure 4, opening the inlet valve 10 permits entrance of the slurry from the supply line 8 endwise into the charge measuring device 9. Entry of the slurry into the device 9 in this manner substantially preserves the fibre orientation established by the viscous flow thereof through the supply line 8. As the measuring chamber of the device 9 fills, the float valves 19 rise to close off the vents 18. At this time the inlet valve 10 is closed, and the closure member 12 at the bottom is displaced (as in Figure 5), to thereby deliver the measured charge from the device 9 sidewise to the subjacent funnels 20 and 21, and through the latter into the mold cavity. This sidewise delivery still substantially preserves the fibre orientation, so that in the mold cavity itself the fibres are predominantly oriented lengthwise of the elongated articles being formed. This preservation of fibre orientation is further enhanced by virtue of the offset of the charge measuring device 9 with respect to the subjacent funnels 20 and 21, as clearly appears in Figures 4 and 5. As there shown the discharge opening 11 is so located as to deliver the charge at least in part against one inclined wall of the funnel 20, and in consequence of this the charge, in effect tends to roll downwardly on the inclined surface of the funnel 20 and similarly on one of the inclined surfaces of the funnel 21, for ultimate delivery through the elongated opening 23 into the mold cavity.

Notwithstanding the interposition of a charge measuring device between the flow or supply line 8, where the fibre orientation is initially established, and the mold cavity itself, the fibre orientation established in the supply line 8 is substantially preserved in the slurry as delivered to the mold cavity.

We claim:

1. Equipment for charging elongated molds with fibre-containing slurry to be molded therein, comprising in combination with a viscous flow supply line for such slurry, an elongated charge measuring device having a slurry inlet at one end in communication with the supply line and having an elongated discharge opening along the bottom of the device for sidewise delivery of a charge into a mold, means for intermittently introducing slurry from the supply line into the charge measuring device through said inlet opening and an elongated displaceable closure member for the discharge opening.

2. A construction according to claim 1 in which the charge measuring device has a vent opening in an upper portion thereof, and further including a float operated valve for closing the vent opening upon filling of the charge measuring device.

3. A construction according to claim 1 in which the charge measuring device and its discharge opening are of substantially the same length as the mold to be charged.

4. Equipment for charging elongated molds with fibre-containing slurry to be molded therein, comprising a measuring device having an elongated substantially closed charge measuring chamber therein, means for filling said chamber with a charge in which the fibres of the slurry are predominantly oriented lengthwise of the chamber, said device having a discharge opening at the bottom of the chamber elongated in the direction of fibre orientation in the charge measuring chamber, and a displaceable closure for the discharge opening, providing for sidewise delivery of an elongated and fibre-oriented charge of slurry into the mold.

5. A construction according to claim 4 and further including an elongated trough below the discharge opening of the charge measuring chamber and having downwardly converging side walls terminating in a spout of elongated horizontal section for guiding the charge delivered from the discharge opening into the mold being charged.

6. A construction according to claim 5 in which the center of the trough is horizontally offset from the discharge opening to provide for dropping of the charge onto a side wall of the trough.

7. A construction according to claim 5 in which the trough is vertically movable to provide for movement of said spout toward and away from a subjacent mold to be charged.

References Cited in the file of this patent

UNITED STATES PATENTS

| | | |
|---|---|---|
| 1,694,563 | Ross et al. | Dec. 11, 1928 |
| 1,888,101 | Wilson | Nov. 15, 1932 |
| 2,347,971 | Sayre | May 2, 1944 |
| 2,471,139 | Benander et al. | May 24, 1949 |
| 2,596,602 | Roddenbery | May 13, 1952 |